United States Patent [19]
Richter

[11] Patent Number: 5,718,822
[45] Date of Patent: Feb. 17, 1998

[54] DIFFERENTIAL PRESSURE APPARATUS FOR DETECTING ACCUMULATION OF PARTICULATES IN A FILTER

[75] Inventor: James R. Richter, Lincolnshire, Ill.

[73] Assignee: The Metraflex Company, Chicago, Ill.

[21] Appl. No.: 534,724

[22] Filed: Sep. 27, 1995

[51] Int. Cl.$^6$ ............................................. B01D 35/143
[52] U.S. Cl. ........................... 210/90; 55/274; 73/716; 200/83 A; 210/446; 210/448
[58] Field of Search ............................ 210/90, 329, 448, 210/446, 447; 73/716, 717, 722, 723, 728; 200/83 A; 55/274, DIG. 34; 95/25

[56] References Cited

U.S. PATENT DOCUMENTS

| | | | |
|---|---|---|---|
| 2,359,938 | 10/1944 | Quiroz | 210/90 |
| 2,942,572 | 6/1960 | Pall | 210/90 |
| 3,077,176 | 2/1963 | Pall et al. | 210/90 |
| 3,283,902 | 11/1966 | Farris et al. | 210/90 |
| 3,591,003 | 7/1971 | Cooper | 210/90 |
| 4,006,083 | 2/1977 | Westervelt et al. | 210/90 |
| 4,029,042 | 6/1977 | Juhasz . | |
| 4,038,189 | 7/1977 | Dison et al. | 210/90 |
| 4,139,466 | 2/1979 | Rosaen | 210/90 |
| 4,626,344 | 12/1986 | Fick et al. | 210/90 |
| 4,654,140 | 3/1987 | Chen | 210/90 |
| 4,783,256 | 11/1988 | Cooper et al. | 210/90 |
| 5,192,425 | 3/1993 | Cyphers et al. | 210/90 |
| 5,194,160 | 3/1993 | Simonelli et al. | 210/741 |

*Primary Examiner*—Joseph W. Drodge
*Attorney, Agent, or Firm*—Hill, Steadman & Simpson

[57] ABSTRACT

An apparatus and a method are provided for detecting accumulation of particulates in a fluid stream. A differential pressure switch is incorporated in the apparatus for detecting changes in pressure in the fluid stream passing through a strainer having a filter wherein the particulates accumulate at the filter. A body is insertable into a wall of the strainer wherein the body is in communication with the fluid stream. A pressure responsive device is responsive to changes in pressure in the fluid stream due to accumulation of the particulates. A signal producing device is activated to produce a signal upon detection of a predetermined pressure differential in the fluid.

20 Claims, 4 Drawing Sheets

DIFFERENTIAL PRESSURE APPARATUS FOR DETECTING ACCUMULATION OF PARTICULATES IN A FILTER

BACKGROUND OF THE INVENTION

The present invention generally relates to a differential pressure switch for incorporating into a body of a strainer through which a fluid stream passes and a method for its use. More specifically, the present invention relates to a differential pressure switch that activates and produces an output signal upon detection of a predetermined amount of accumulation of particulate on a filter in a strainer.

It is, of course, generally known to provide a strainer in a fluid stream. A variety of strainers, such as Y-type and basket-type strainers, are known which incorporate a filter therein that collects particulates contained in the fluid. Often, however, the particulates on the filter or otherwise removed from the fluid stream by the filter become so great that the filter or the container which collects the particulates must be cleaned, dispensed, disposed of, or the like. Therefore, routine checks of the filter or the container which collects the particulates are performed to determine whether the same requires replacement or cleaning. Often, these checks are missed or conducted at times when the same is not required. As a result, additional labor is required and/or the system operates with reduced efficiency when a filter goes unreplaced for an extensive time period.

A need, therefore, exists for an apparatus that detects accumulation of particulates in a fluid stream and a method for detecting accumulation of particulates in a fluid stream with a differential pressure switch capable of detecting changes in pressure in a fluid stream passing through a strainer having a filter wherein particulates accumulate at the filter.

SUMMARY OF THE INVENTION

The present invention provides an apparatus and a method for detecting accumulation of particulates in a fluid stream. In addition, the present invention provides a differential pressure switch for detecting changes in pressure in a fluid stream passing through a strainer having a filter wherein particulates accumulate at the filter.

To this end, in an embodiment, an apparatus is provided for detecting accumulation of particulates in a fluid stream. The apparatus has a strainer having an interior through which the fluid stream passes between an inlet and an outlet. A filter is situated intermediate the inlet and the outlet capable of collecting the particulates in the fluid stream. A differential pressure switch is capable of detecting a pressure difference between an upstream side of the filter and a downstream side of the filter and producing a signal upon detection of a predetermined pressure difference.

In an embodiment, output means receives the signal from the differential pressure switch and produces an output signal. The output signal may be audible or visible.

In an embodiment, the strainer is a Y-type.

In another embodiment, the strainer is a basket-type.

In an embodiment, a diaphragm is constructed and arranged to contact the differential pressure switch wherein the diaphragm flexes with changing pressure. A push rod is in contact with the diaphragm wherein the push rod is responsive to movement of the diaphragm to cause activation of the differential pressure switch.

In another embodiment of the present invention, a method is provided for detecting accumulation of particulates in a fluid stream. The method comprises the steps of: providing a passageway having an interior defined between an inlet and an outlet through which the fluid stream passes wherein the passageway is subjected to the accumulation of particulates; sensing a pressure differential in the fluid stream at a point intermediate the inlet and the outlet; and producing a signal upon sensing a predetermined pressure differential indicative of a predetermined amount of the accumulation of the particulates.

In an embodiment, the method further comprises the step of providing a filter in the fluid stream on which the particulates accumulate.

In an embodiment, the method further comprises the step of producing an output upon receipt of the signal. The output may be audible or visible.

In an embodiment, the method further comprises the step of providing a diaphragm at an outlet point in the fluid stream wherein the diaphragm is flexible and is responsive to changes in pressure.

In an embodiment, the passageway is a Y-type strainer.

In another embodiment, the passageway is a basket-type strainer.

In another embodiment of the present invention, a differential pressure switch detects changes in a fluid stream passing through a strainer having a filter wherein particulates accumulate at the filter. The switch has a body insertable into a wall of a strainer wherein the body has an interior with a port in communication with the fluid stream. Pressure responsive means is in communication with the fluid stream responsive to changes in pressure in the fluid stream due to accumulation of the particulates. Signal producing means activates to produce a signal upon detection of a predetermined pressure differential in the fluid stream.

In an embodiment, a push rod in the interior of the body is movable in response to changes in pressure. A first contact is connected to the push rod and a second contact is in the interior of the body wherein the first contact meets the second contact upon occurrence of the predetermined pressure differential in the fluid stream.

In another embodiment, a magnet carried on a flexible diaphragm may be deflected by a pressure differential in the fluid stream towards an open contact, which might include a spring loaded lever arm, causing the contact to close and allowing the contact to reopen when the diaphragm and magnet move away from the contact.

In an embodiment, output means is connected to the signal producing means capable of producing an output signal. The output signal may be audible or visible.

In an embodiment, threads are provided on an exterior of the body for attaching the body to the strainer.

It is, therefore, an advantage of the present invention to provide an apparatus and a method for detecting accumulation of particulates in a fluid stream.

Another advantage of the present invention is to provide an apparatus and a method for reducing labor costs associated with detecting accumulation of particulates in a fluid stream.

Yet another advantage of the present invention is to provide an apparatus and a method that improves efficiency of a system having a strainer which filters particulates from a fluid stream.

A still further advantage of the present invention is to provide a differential pressure switch that operates in conjunction with the apparatus and the method for detecting changes in pressure in a fluid stream.

Further, an advantage of the present invention is to provide a differential pressure switch that is mechanical in nature.

And, another advantage of the present invention is to provide a differential pressure switch that is electronic in nature that is capable of detecting predetermined amounts of pressure differential in a fluid stream.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an apparatus and a method for detecting accumulation of particulates in a fluid stream as well as a differential pressure switch incorporated therein capable of detecting changes in pressure in a fluid stream passing through an apparatus, such as a strainer having a filter, wherein particulates accumulate at the filter. While the present invention is described with reference to a fluid, the term "fluid" should be broadly interpreted to encompass either a liquid and/or a gas that passes through the system. The strainers of the present invention may be used in any pipeline or similar system for transfer of steam, air, water, oil, gas, chemicals, or the like. The strainers described are Y-type or basket-type strainers, but other strainers may, of course, be implemented by those skilled in the art.

Figure 1:
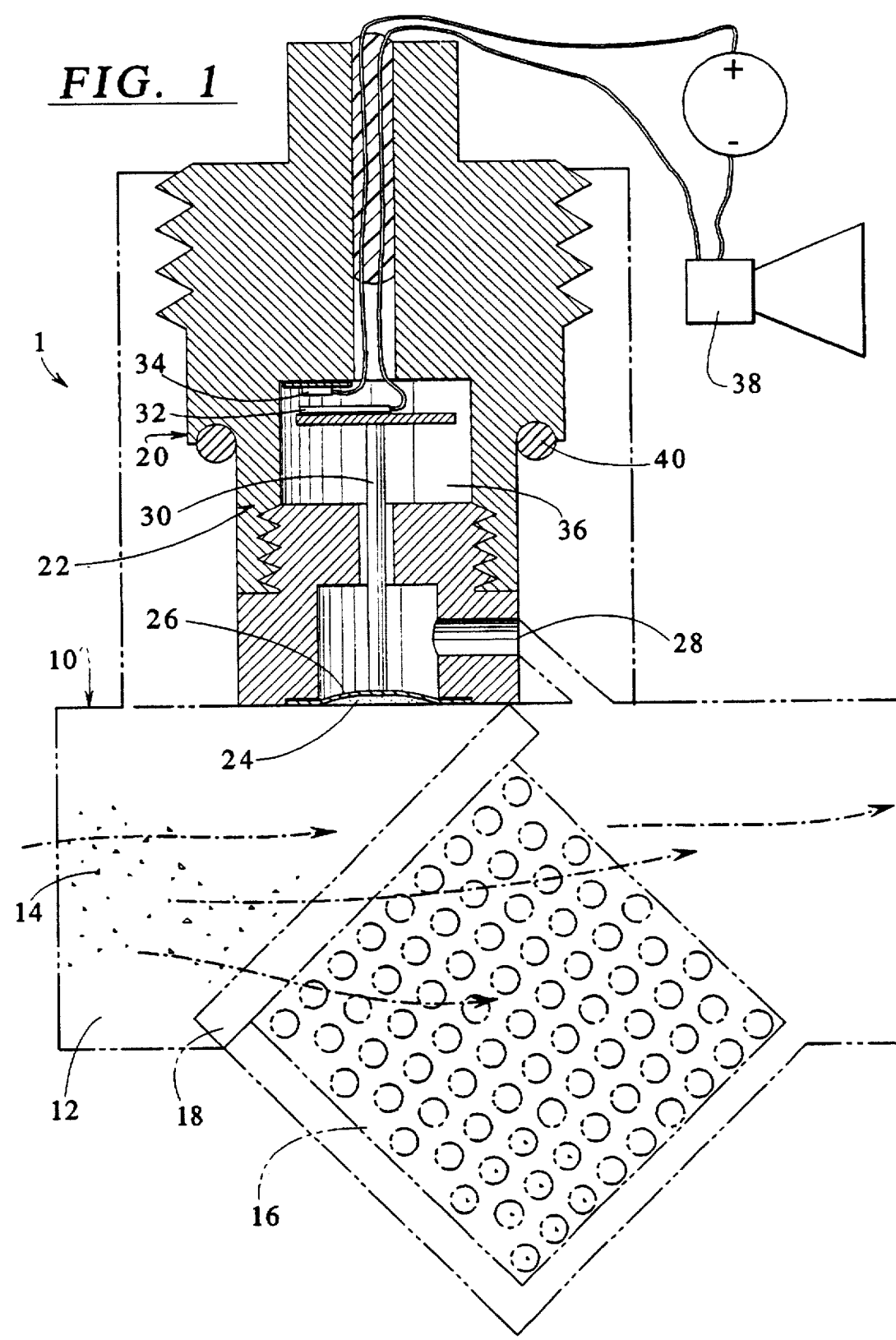
FIG. 1 illustrates a cross-sectional view of an embodiment of a pressure differential switch of the present invention incorporated into a strainer in a non-activated state.

Referring now to the drawings wherein like numerals refer to like parts, FIG. 1 illustrates a system 1 including a pipeline 10 or other like chamber through which a fluid 12 may pass in the direction indicated by the arrows. Typically, the fluid 12 includes particulates 14 as a part of the fluid 12. A collection chamber 16 is provided to collect the particulates 14 in the fluid 12. To this end, a screen or filter 18 is provided to remove the particulates 14 from the fluid 12 as it flows through the pipeline 10 in the direction shown by the arrows.

Figure 2:
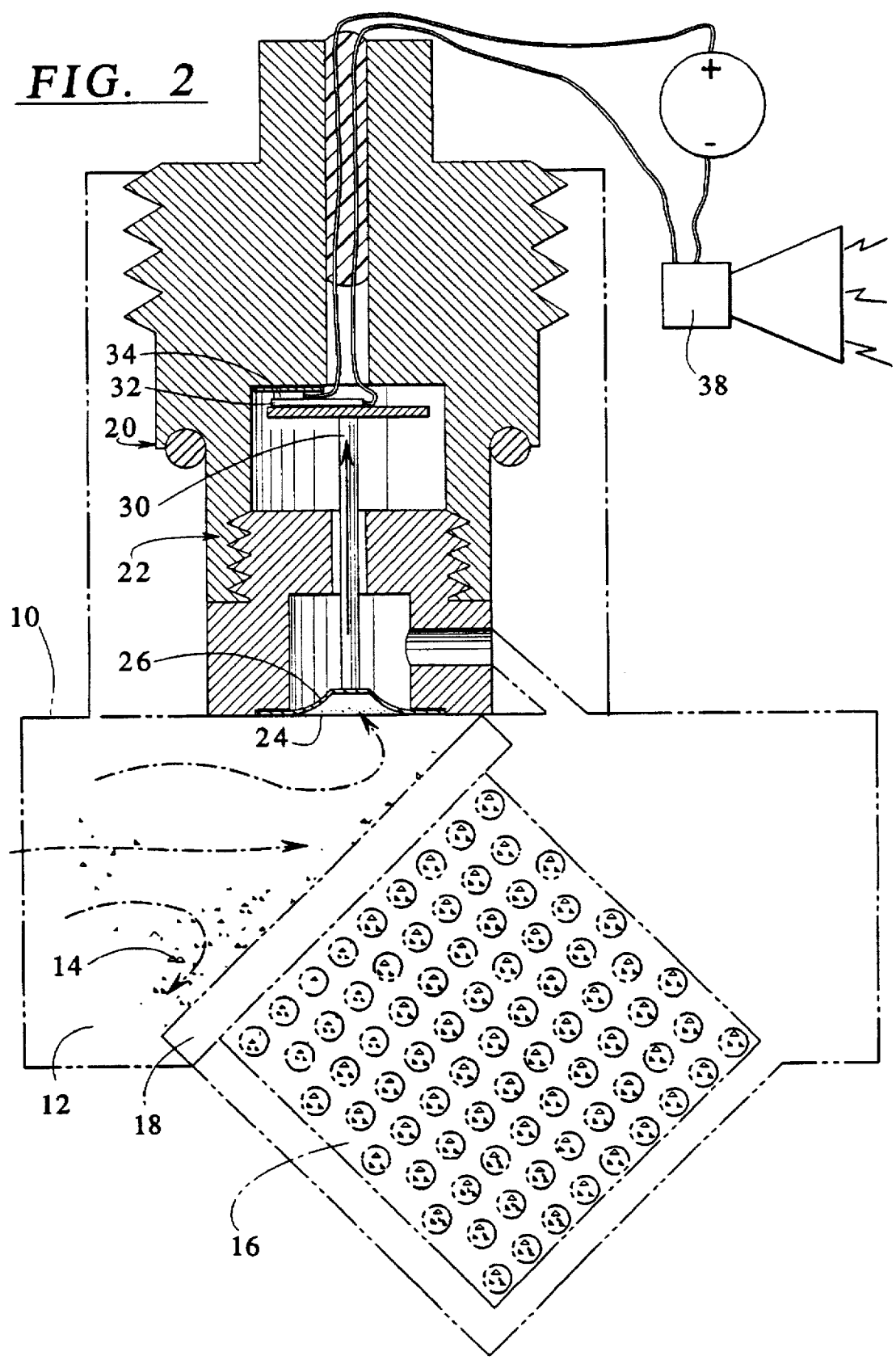
FIG. 2 illustrates a cross-sectional view of an embodiment of a pressure differential switch of the present invention incorporated into a strainer in its activated state.

In accordance with the present invention, a differential pressure switch 20 is incorporated in the system 1 to detect a build-up or accumulation of the particulates 14 that have collected in the pipeline 10 on the filter 18 and in the collection chamber 16. Upon 10 accumulation of a predetermined amount of the particulates 14, the differential pressure switch 20 is activated as will be described with reference to FIG. 2.

Referring again to FIG. 1, the differential pressure switch 20 includes a body 22 having a first open end 24 covered by a flexible diaphragm 26. The open end 24 is in fluid communication with an upstream side of the pipeline 10, i.e. upstream of the filter 18. A second opening 28 is provided in the switch 20 and is in fluid communication with a downstream side of the pipeline 10, i.e. downstream of the filter 18. A push rod 30 is in contact with the flexible diaphragm 26 and moves with the diaphragm 26 in response to changes in pressure within the pipeline 10.

As the particulates 14 accumulate in the pipeline 10, particularly on the screen or filter 18, pressure in the upstream side of the pipeline 10 increases as compared to the pressure on the downstream side. Therefore, the flexible diaphragm 26 is pushed forcing the push rod 30 in the direction shown by the arrow on the push rod 30 in FIG. 2. A contact 32 is attached to an end of the push rod 30 or may be integrally formed therewith. A second contact 34 is provided in an interior space 36 of the switch 20.

When the contacts 32,34 meet due to accumulation of a predetermined amount of the particulates 14, a signal is produced and sent to an output 38 to produce, for example, an audible or visible signal such as a flashing light or the like. In another embodiment, a signal may be produced to drive a controller. The controller, in turn, may control flow, such as by opening a by-pass valve to allow the fluid to exit an area.

Figure 5:
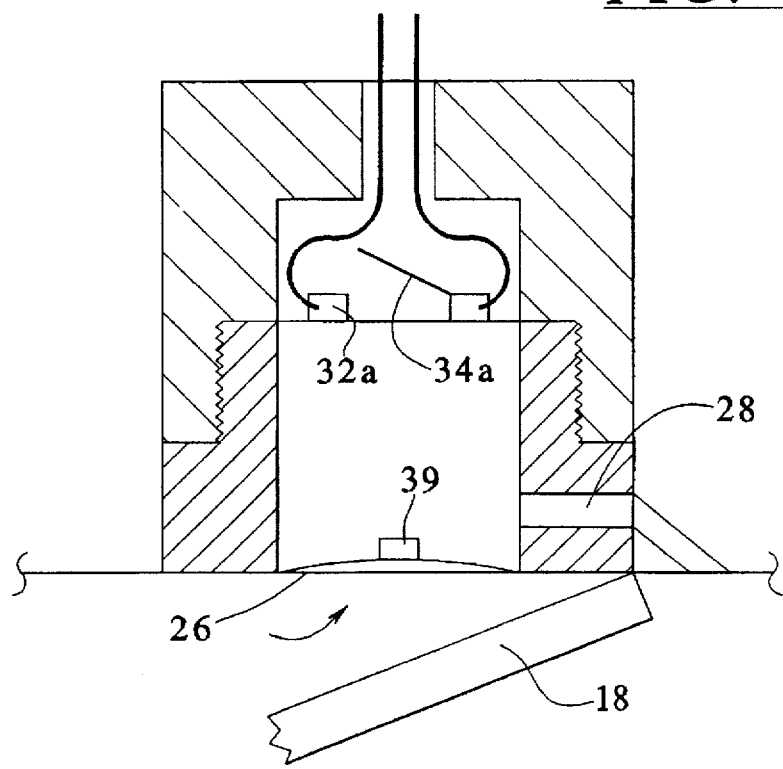
FIG. 5 illustrates an alternate embodiment of a pressure differential switch utilizing a magnet, and shown in an open position.
Figure 6:
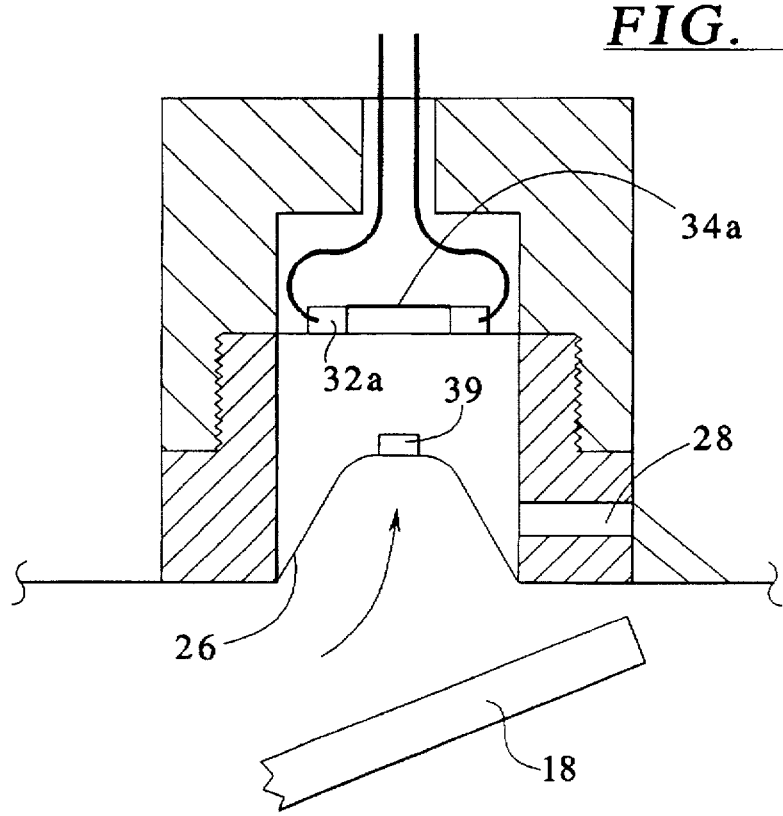
FIG. 6 illustrates the embodiment of the pressure differential switch of FIG. 5, in a closed position.

In another embodiment shown in FIGS. 5 and 6, the diaphragm 26 may carry on its upper surface a magnet 39 and one of the contacts, 34a, could be a spring loaded lever arm which, when the magnet is moved toward the contacts, attracts the lever arm causing it to move forward and engage the other contact, 32a, thus closing the circuit and causing the signal to be produced as described. When the diaphragm 26 and magnet move away from the contacts, the contacts will separate due to the resiliency of the spring loaded lever arm, opening the circuit and terminating the signal.

As illustrated in the figures, the differential pressure switch 20 may be threadably attached in a wall of the strainer or pipeline 10. An O-ring 40 or other sealing member may be provided to seal the switch in the wall of the pipeline or strainer.

Figure 3:
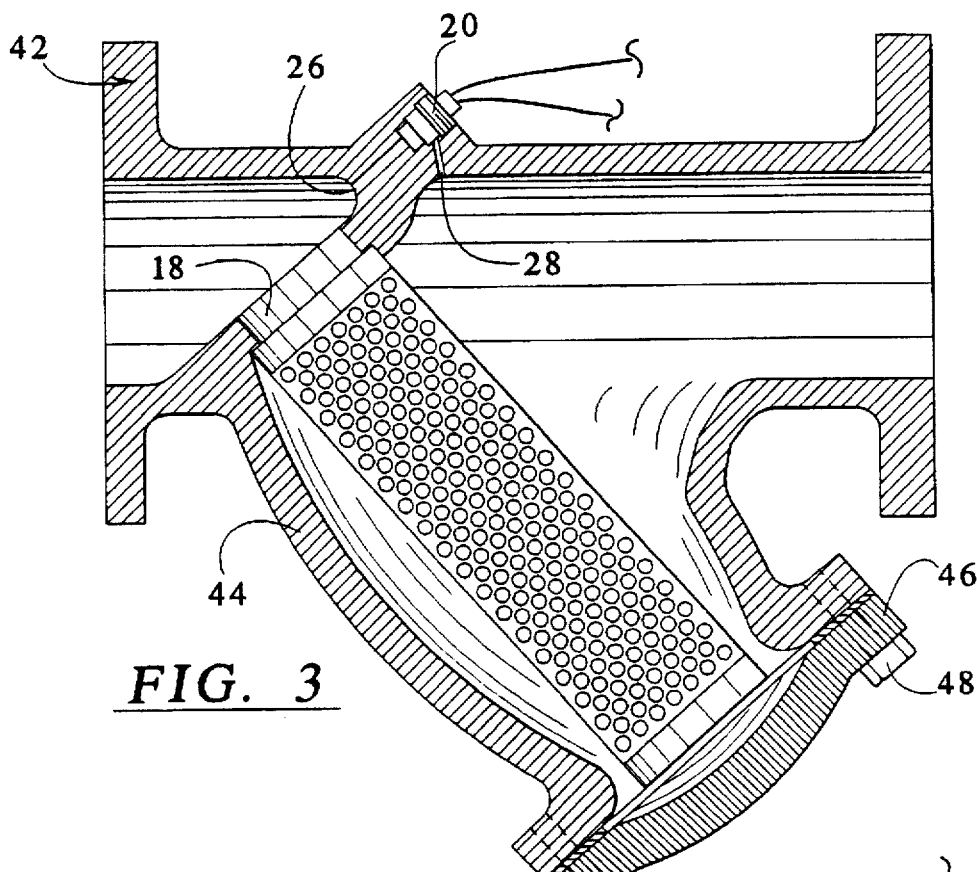
FIG. 3 illustrates a cross-sectional view of an embodiment of a Y-type strainer of the present invention with a differential pressure switch incorporated therein.
Figure 4:
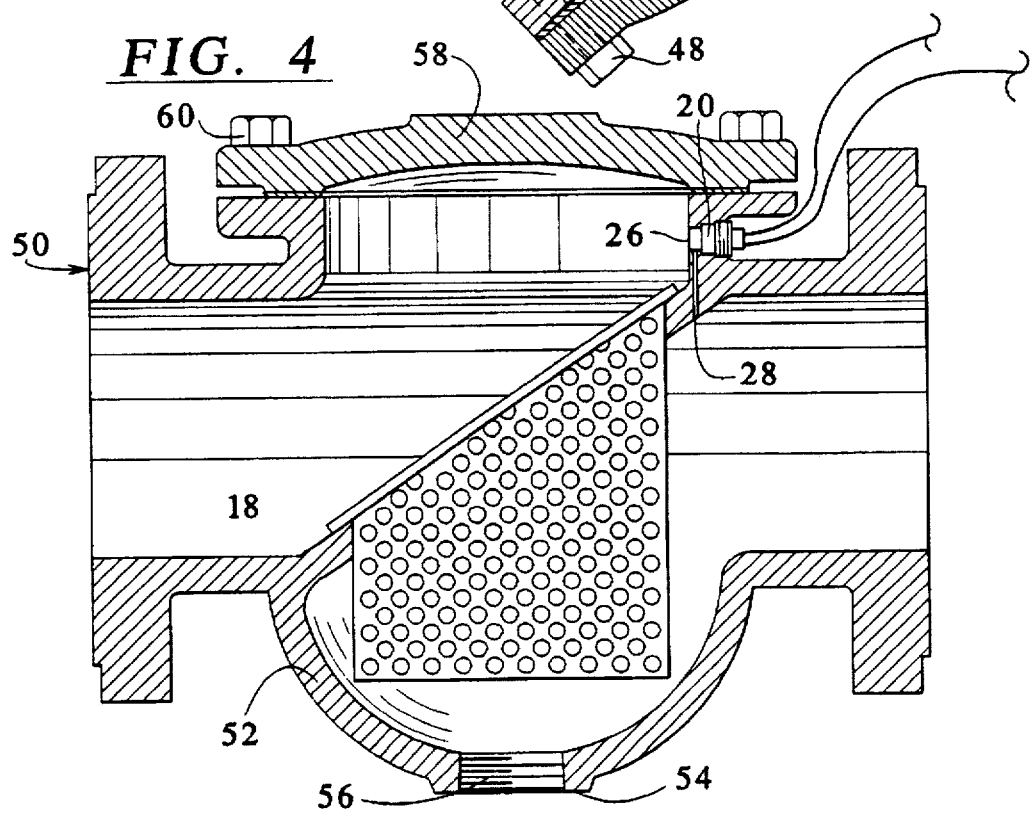
FIG. 4 illustrates a cross-sectional view of an embodiment of a basket-type strainer of the present invention with a differential pressure switch incorporated therein.

Referring now to FIGS. 3 and 4, two different types of strainers are illustrated incorporating the differential pressure switch 20 of the present invention. FIG. 3 illustrates a Y-type strainer 42 that may be attached to a pipeline, and particulate matter may be collected in a chamber 44 directed at an angle with respect to the flow of fluid. At an end of the chamber 44 is a cover 46 that may be removed for cleaning of the chamber 44. To this end, fasteners 48 secure the cover 46 to the chamber 44 formed integrally and as a part of the strainer 42.

Similarly, a basket-type strainer 50 is shown in FIG. 4 incorporating the differential pressure switch 20 of the present invention. The basket-type strainer 50 includes an integrally formed chamber 46 that collects the particulates that are removed by the filter 18 into the chamber 52. The chamber 52 includes a bottom portion 54 having an aperture that may be opened by removing a plug 56 (not shown) from a threaded opening 56. Upon removal of the plug, the chamber 52 may be drained of the particulates accumulated therein. The basket type strainer 50 may further include a cover 58 fastened to the body of the strainer 50 by fasteners 60 or the like.

It should be understood that the present invention may be implemented with any strainer or directly in a wall of a pipeline. The pipeline may be of any size and/or diameter. Likewise, the strainer may incorporate any size pipeline. Preferably, the strainers accommodate pipelines ranging in sizes from one-quarter of an inch to twenty inches. The bodies of the strainers are preferably made from cast iron or plastic with the screens therein preferably made from stainless steel. Of course any material may be implemented depending on the application of the strainer with the pipeline.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for detecting accumulation of particulates in a fluid stream, said apparatus comprising:

a strainer housing having an interior through which said fluid stream passes between an inlet and an outlet, and a threaded opening in communication with said interior;

a filter situated intermediate said inlet and said outlet capable of collecting said particulates in said fluid stream; and a differential pressure switch capable of detecting a pressure difference between an upstream side of said filter and a downstream side of said filter and producing a signal upon detection of a predetermined pressure differential, said pressure switch comprising:

a body insertable into said threaded opening of said strainer housing wherein said body has an interior with a first port in communication with said fluid stream upstream of said filter and a second port in communication with said fluid stream downstream of said filter;

a diaphragm positioned in said body between said two ports to flex with changing pressure;

a pair of normally separated electrical contacts and means associated with said diaphragm to cause engaging of said contacts upon sufficient flexure of said diaphragm; and signal producing means activated upon closure of said contacts to produce a signal.

2. The apparatus of claim 1 further comprising: output means receiving the signal from the differential pressure switch and producing an output signal.

3. The apparatus of claim 2 wherein the output signal is visible.

4. The apparatus of claim 1 wherein the strainer housing is a Y-type.

5. The apparatus of claim 1 wherein the strainer housing is a basket-type.

6. The differential pressure switch of claim 1 further comprising:

a magnet carried on said diaphragm;

a first contact in the interior of said body; and a second contact in the interior of the body attractable towards the first contact upon a predetermined movement of the magnet towards the second contact.

7. The apparatus according to claim 1, wherein said first port comprises an open end of said body and said diaphragm is positioned to cover said open end.

8. The apparatus according to claim 1, wherein said means associated with said diaphragm comprises a push rod in contact with said diaphragm wherein said push rod is arranged to move with said diaphragm when said diaphragm flexes.

9. The apparatus according to claim 8, wherein said push rod carries a first of said electrical contacts, while a second of said contacts is stationarily mounted within said body.

10. The apparatus according to claim 1, wherein said second contact includes a magnetically attractable connector which is normally biased away from said first contact, but which is attracted towards and into contact with said first contact when said magnet is moved towards said connector.

11. An apparatus for detecting accumulation of particulates in a fluid stream, said apparatus comprising:

a strainer housing having an interior through which said fluid stream passes between an inlet and an outlet and a threaded opening in communication with said interior;

a filter situated intermediate said inlet and said outlet capable of collecting said particulates in said fluid stream; and a differential pressure switch capable of detecting a pressure difference between an upstream side of said filter and a downstream side of said filter and producing a signal upon detection of a predetermined pressure differential, said pressure switch comprising:

a body insertable into said threaded opening of said strainer housing wherein said body has an interior with a first port forming an open end of said body in communication with said fluid stream upstream of said filter and a second port in communication with said fluid stream downstream of said filter;

a diaphragm positioned to cover said open end of said body between said two ports to flex with changing pressure;

a pair of normally separated electrical contacts and a push rod in contact with said diaphragm wherein said push rod carries a first of said contacts and is arranged to move with said diaphragm when said diaphragm flexes to cause said first contact to engage a second of said contacts which is stationarily mounted in said body upon sufficient flexure of said diaphragm; and signal producing means activated upon closure of said contacts to produce a signal.

12. The apparatus according to claim 11, wherein said signal is visible.

13. The apparatus according to claim 11, wherein said signal is audible.

14. The apparatus according to claim 11, wherein said strainer housing is a Y-type.

15. The apparatus according to claim 11, wherein said strainer housing is a basket-type.

16. An apparatus for detecting accumulation of particulates in a fluid stream, said apparatus comprising:

a strainer housing having an interior through which said fluid stream passes between an inlet and an outlet and a threaded opening in communication with said interior;

a filter situated intermediate said inlet and said outlet capable of collecting said particulates in said fluid stream; and a differential pressure switch capable of detecting a pressure difference between an upstream side of said filter and a downstream side of said filter and producing a signal upon detection of a predetermined pressure differential, said pressure switch comprising:

a body insertable into said threaded opening of said strainer housing wherein said body has an interior with a first port forming an open end of said body in communication with said fluid stream upstream of said filter and a second port in communication with said fluid stream downstream of said filter;

a diaphragm positioned to cover said open end of said body between said two ports to flex with changing pressure;

a pair of normally separated electrical contacts and a magnet in contact with said diaphragm wherein said magnet is arranged to move with said diaphragm when said diaphragm flexes and wherein one of said electrical contacts includes a magnetically attractable connector which is normally biased away from the other of said contacts, but which is attracted towards and into contact with said other of said contacts when said magnet is moved towards said connector upon sufficient flexure of said diaphragm; and signal producing means activated upon closure of said contacts to produce signal.

17. The apparatus according to claim 16, wherein said output signal visible.

18. The apparatus according to claim 16, wherein said output signal is audible.

19. The apparatus according to claim 16, wherein said strainer housing is a Y-type.

20. The apparatus according to claim 16, wherein said strainer housing is a basket-type.

* * * * *